United States Patent [19]

Tyvela

[11] Patent Number: 5,183,272
[45] Date of Patent: Feb. 2, 1993

[54] UNIVERSAL CHUCK STOP

[76] Inventor: Einar J. Tyvela, 24636 Luns Ford Ct., Damascus, Md. 20872

[21] Appl. No.: 788,599

[22] Filed: Nov. 6, 1991

[51] Int. Cl.⁵ .............................. B23B 3/02
[52] U.S. Cl. ........................ 279/156; 279/2.15
[58] Field of Search ......... 279/156, 123, 2.13–2.15, 279/110, 1 S

[56] References Cited

U.S. PATENT DOCUMENTS

| | | | |
|---|---|---|---|
| 3,124,025 | 3/1964 | Bohnet | 279/156 X |
| 3,158,382 | 11/1964 | O'Neill | 279/156 X |
| 3,599,997 | 8/1971 | Oliver | 279/156 |
| 4,262,916 | 4/1981 | Tykwinski | 279/156 |
| 4,418,592 | 12/1983 | Altman | 279/156 X |

FOREIGN PATENT DOCUMENTS

| | | | |
|---|---|---|---|
| 684401 | 11/1939 | Fed. Rep. of Germany | 279/1 S |
| 2525103 | 12/1977 | Fed. Rep. of Germany | 279/1 S |
| 117624 | 11/1946 | Sweden | 279/1 S |

OTHER PUBLICATIONS

"Workpiece Support Speeds Chucking on Small Areas", by M. W. Loftus, in *The Tool and Manufacturing Engineer* (vol. 46, #1, Jan., 1961), p. 76.

*Primary Examiner*—Steven C. Bishop
*Attorney, Agent, or Firm*—Cushman, Darby & Cushman

[57] ABSTRACT

A chuck stop for a multi jaw chuck which has plural webs and a means to grip the bore of the chuck to secure the stop. The webs rest between the jaws so as not to interfere with the action of the chuck. First surfaces of the webs abut the face of the chuck. Work can be squarely aligned against second surfaces of the webs, which are opposite and parallel to the first surfaces.

20 Claims, 4 Drawing Sheets

UNIVERSAL CHUCK STOP

FIELD OF THE INVENTION

This invention pertains to a new device for use with a lathe equipped with a multi-jaw chuck.

BACKGROUND OF THE INVENTION

In performing work on a lathe equipped with a multi-jaw chuck it is often necessary to align the work so that the axis of the work is parallel with the axis of the lathe. By way of example, a work-piece shaped approximately like a flat disk has a virtual axis. This virtual axis is a line perpendicular to the plane of the disk. In order to machine this part correctly, the disk should be placed in the jaws of the lathe so that its axis is parallel with the lathe axis. A sleeve also has an axis which is a line centered in an parallel to the sleeve itself. In order to perform a machine operation, such as machining the outer, peripheral surface of the sleeve after it has been bored and turned, it is necessary to clamp the sleeve in the multi-jaw chuck such that its axis is parallel to the axis of the lathe. Similarly, rings, spacers and various other parts should be aligned to be parallel to the axis of the lathe in the jaws of the lathe.

The usual method, which is generally known and practiced, for aligning work in a multi-jaw chuck, is to place two parallel supports against the front flat surface of the chuck between the jaws of the chuck. The work-piece is then placed against the parallel supports. This process entails considerable time and effort. The operator must simultaneously: 1. hold the parallel supports spaced apart with their narrow edge against the chuck and the work-piece; 2. hold the work-piece flatly on the parallel supports; and 3. close the chuck jaws on the work-piece. If a lot of work is to be finished, the task of aligning the work-piece in the jaws becomes a tedious and time consuming part of the production.

Further, if the parallel supports are not removed from the chuck before lathe operation is begun, they can be propelled at a high rate of speed, as is common in the art.

Since the edge of the disk thin and relatively weak compared to the leveraged force applied by the jaws of the chuck, it is often difficult to align the disk in the jaws of the chuck so that the axis of the disk is parallel to the axis of the lathe. In addition, it is well known in the art that it is difficult to properly align disks in the jaws of a chuck. Improper alignment leads to non-uniform thickness and uneven cuts on the work-piece.

Referring to FIG. 1, a conventional three jaw chuck as known in the machine tool art is shown. The chuck 4 is shown holding a disk work-piece 6. The chuck is fitted on a lathe 7 which is partially shown. The chuck comprises three jaws 1,1' (two are seen in the view of the figure) which are spaced equally about the body 3 of the chuck 4. The jaws are slidably moveable along tracks 8 to expand and contract radially so that they can be adjusted to the proper alignment and hold a work-piece such as the disk 6. The jaws are moved by turning an adjustment screw 2 located on the body 3 of the chuck. Bore 5 is located in the center of the chuck 4.

The disk 6 is clamped in the chuck 4 so that it is skewed and not perfectly square in the chuck 4. As stated above this error is not easily avoided, particularly in the case of fragile parts such as a thin disk work-piece. Arrow C in the drawing represents the axis of the lathe, which is the virtual axis about which the spindle and chuck of the lathe rotate. Arrow P in the drawing represents the axis of the work-piece that is the centerline or axis of symmetry of the work-piece. As shown in the drawing the axis of the work-piece and the axis of the lathe are not parallel.

As shown in FIG. 1 the disk has been clamped in the jaws 1 so that the axis of the disk is not parallel with that of the lathe. An imaginary plane through the points of the jaw in contact with the disk is not perpendicular to the axis of the lathe. The degree to which it is skewed has been exaggerated for the purpose of clarity. In actuality, a disk could be skewed so minimally that the skew could not be observed by the operator but the work-piece would still be incorrectly machined because of the skew. For example, if the outer, planar surface of the disk 6, as shown in FIG. 1, were being machined, the resulting work-piece would have a varied thickness rather than the desired uniform thickness.

U.S. Pat. No. 3,032,347 to Cameron discloses a chuck stop comprising a hub and three radially projecting arms. The draw plug of a lathe is threaded into a threaded hole within the hub, thereby securing the chuck stop on the chuck. Threaded holes on the radially projecting arms are provided to secure spacer members, attached thereto, thereby providing variable axial placement for a work-piece to be machined.

The chuck stop according to the '347 patent is disadvantageous in that the chuck stop prevents the jaws of the chuck from closing and holding work-pieces whose radial dimensions are less than that of the hub. That is, the jaws of the chuck are restricted by the radial dimensions of the hub.

Cameron relies on spacer members to provide axial location of the work-piece. Different sized spacer members are provided in an economically reasonable number thereby prohibiting precise adjustment of the axial location of the disk as is necessary for accurately machining a work-piece disk.

Cameron uses a dark screw which is relatively small in diameter (as shown) and has external threads. Existing lathes are made predominantly with large diameter draw screws that have internal threads. The predominant lathe design is incompatible with the chuck stop taught by Cameron.

U.S. Pat. No. 2,842,371 to Kersten discloses a work-piece holding device. Axial adjustment of the device taught by Kersten to accommodate work-pieces of different thicknesses requires adjustment of three screws. Since adjustment of the each screw affects the angular orientation of the device, adjustment of the screw on one arm 17 would affect the micrometer reading at micrometer receiving bore 49 on the two other arms. Final adjustment of the device to a new axial position requires at least two adjustments of each screw. Moreover screw settings are subject to change during storage of the device.

U.S. Pat. No. 4,262,916 to Tykwinski discloses a chuck having a keep stop and accessories. Tykwinski provides for a work-piece to be supported on a chuck on a centrally disposed rod-like member 76 (FIG. 5) or on the end of a larger diameter cylindrical member 235. The rod like member does not provide a wide support area to ensure that the axis of the work-piece is parallel with the axis of the chuck stop. The cylindrical member limits closure of the chuck stop.

It is also noted that U.S. Pat. No. 2,524,006 to Capallazzi discloses plural discrete spacer members 14 which are secured on the face of the chuck.

SUMMARY OF THE INVENTION

According to this invention, an apparatus is provided for use with a multi-jaw chuck. The apparatus can be attached to the multi-jaw chuck and provides a surface which is square with the axis of the multi-jaw chuck and which is used to align work-pieces with respect to the axis of the multi-jaw chuck.

In a preferred embodiment of the invention, the apparatus comprises: a hub portion which is preferably tubular, adapted to securely fit within the bore of the multi-jaw chuck, and a web portion comprising a quantity of webs equal in number to the number of jaws of the chuck with which it is used, said webs comprising first faces which are disposed in relation to said tubular portion so as to be perpendicular to the lathe axis, and opposite second faces which are parallel to said first faces and provide a surface against which a work-piece can be bared thereby, perpendicularly aligning the work-piece with the lathe axis. The second faces may have a soft face plate preferably made of aluminum. The aluminum face plate can be changed when they have become worn. The aluminum face plates may be machined so as to accommodate work-pieces with a spacial such as protrusions on the face opposite the face to be machined.

Slotted spaces between said webs extend along the tubular portion of the hub to the bore of the chuck thereby minimizing interference with the jaws as they contract to their closed position.

The web position is secured to the chuck by clamping inserts which, by mechanical action, are flared outward against the inside of the bore of the chuck thereby, fastening the web portion in place, relative to the chuck.

It is an object of this invention to provide an apparatus which facilitates and improves the alignment of work-pieces in the jaws of a multi-jaw chuck.

It is an object of the invention to provide an apparatus which does not require multiple precision adjustments to set up.

It is another object of this invention to provide an apparatus which enables work-pieces to be set up in the jaws of a multi-jaw chuck in minimal time.

It is a further object of this invention to provide an apparatus which enables work pieces to be accurately set up in the jaws of the multi-jaw chuck with less effort by a less skilled operator.

It is a further object to provide a chuck stop which can be custom machined to accommodate oddly shaped parts.

It is a still further object of the invention to provide a means of aligning work-pieces in the jaws of the multi-jaw chuck that does not require parallel supports that can be projected at dangerous velocity if they are not securely attached to the chuck when the lathe is operated.

DETAILED DESCRIPTION OF THE PREFERRED EMBODIMENT

Figure 1:
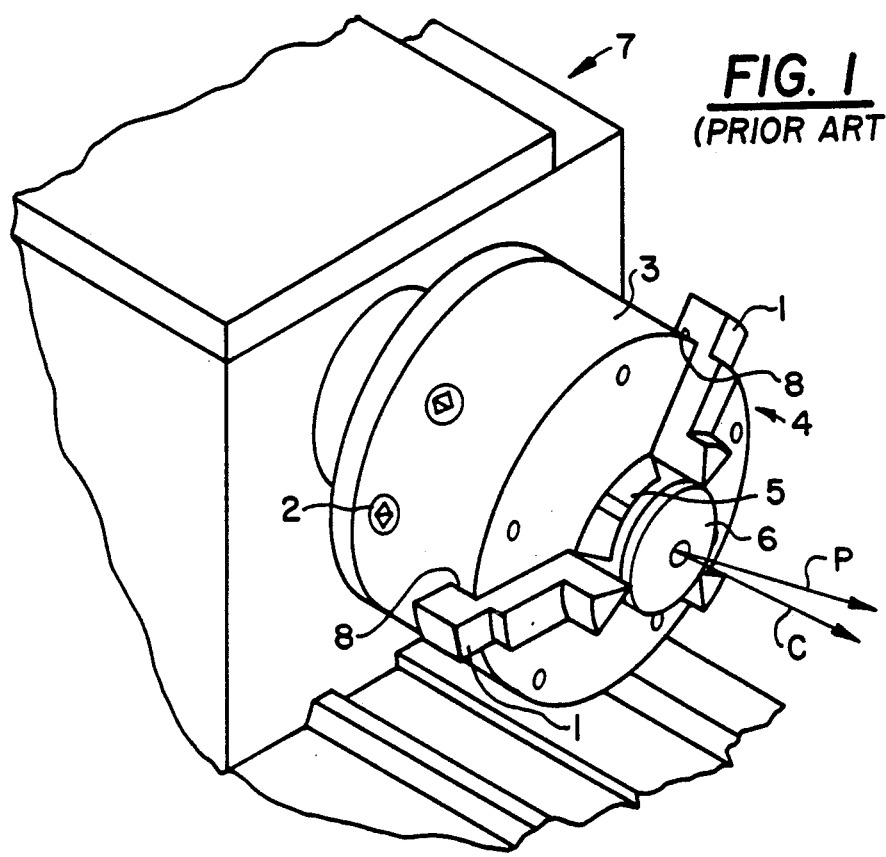
FIG. 1 depicts a three jaw lathe chuck holding a thin disk to be machined.
Figure 4:
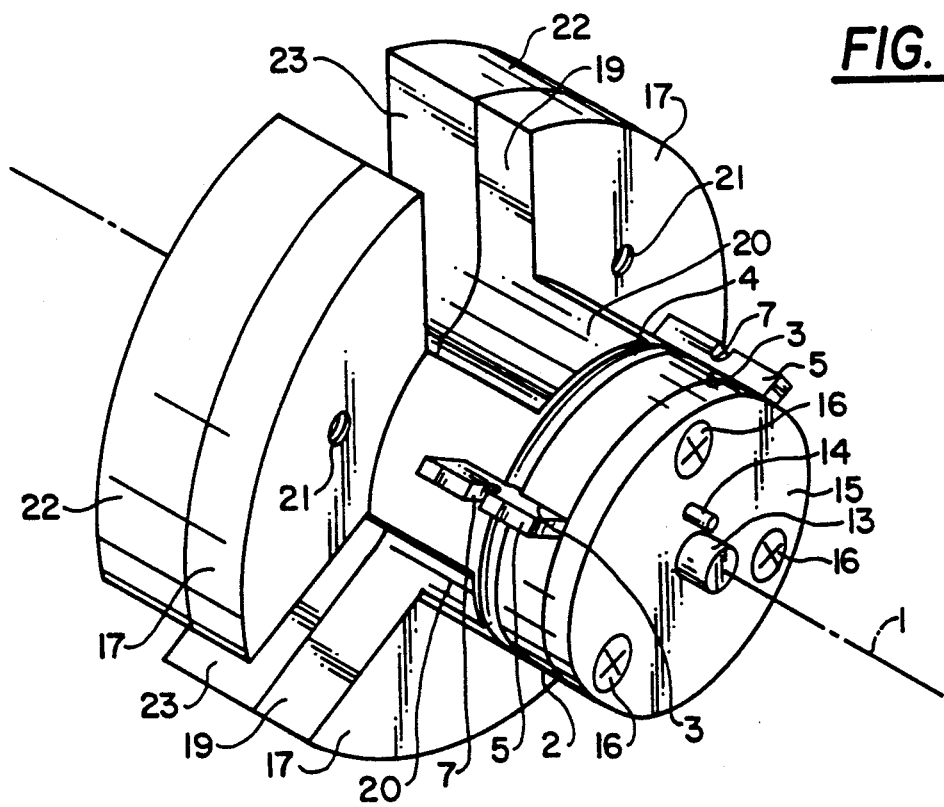
FIG. 4 is a oblique view of an apparatus according to this invention.
Figure 2:
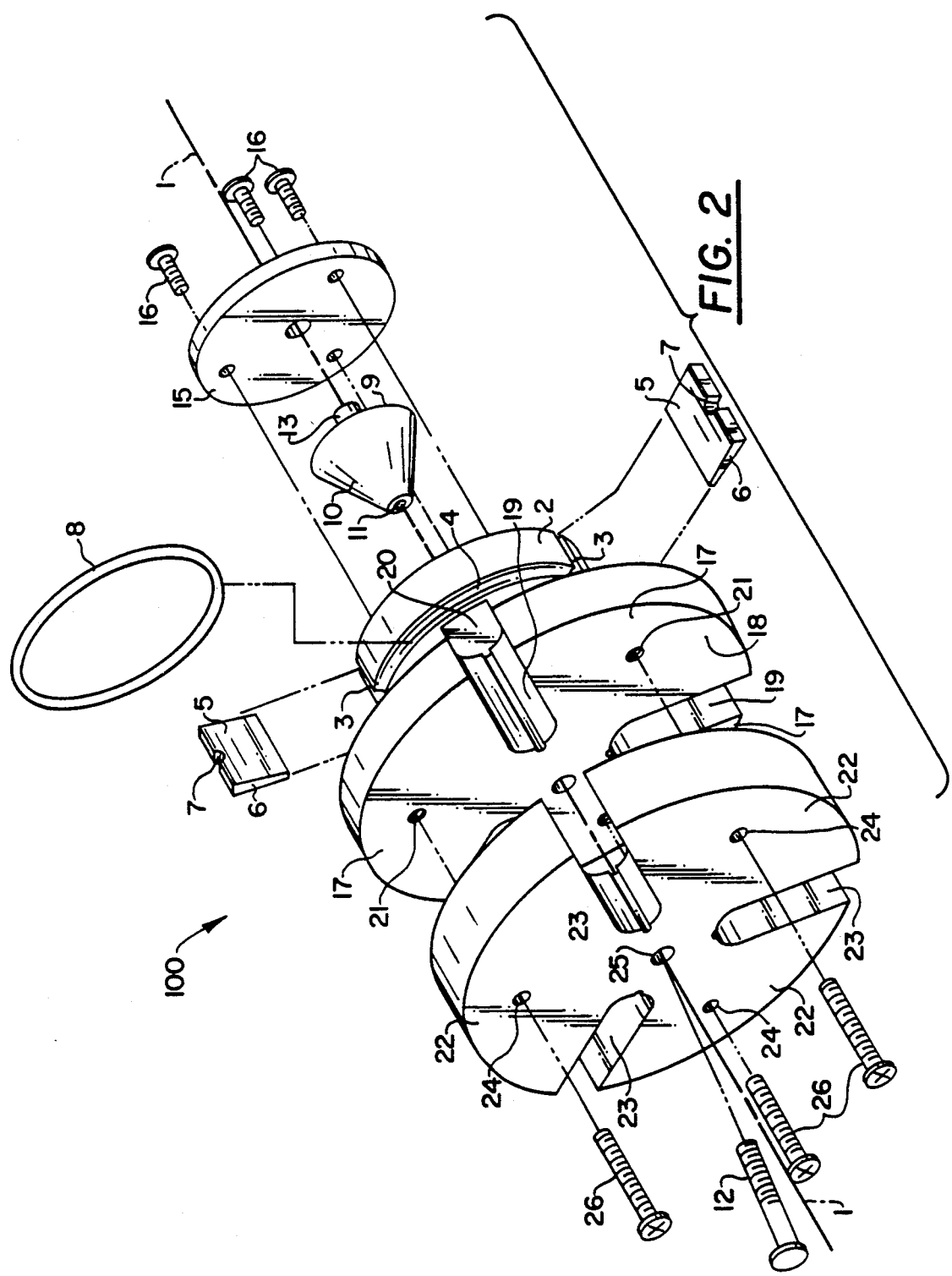
FIG. 2 is an exploded view of an apparatus according to this invention.
Figure 3:
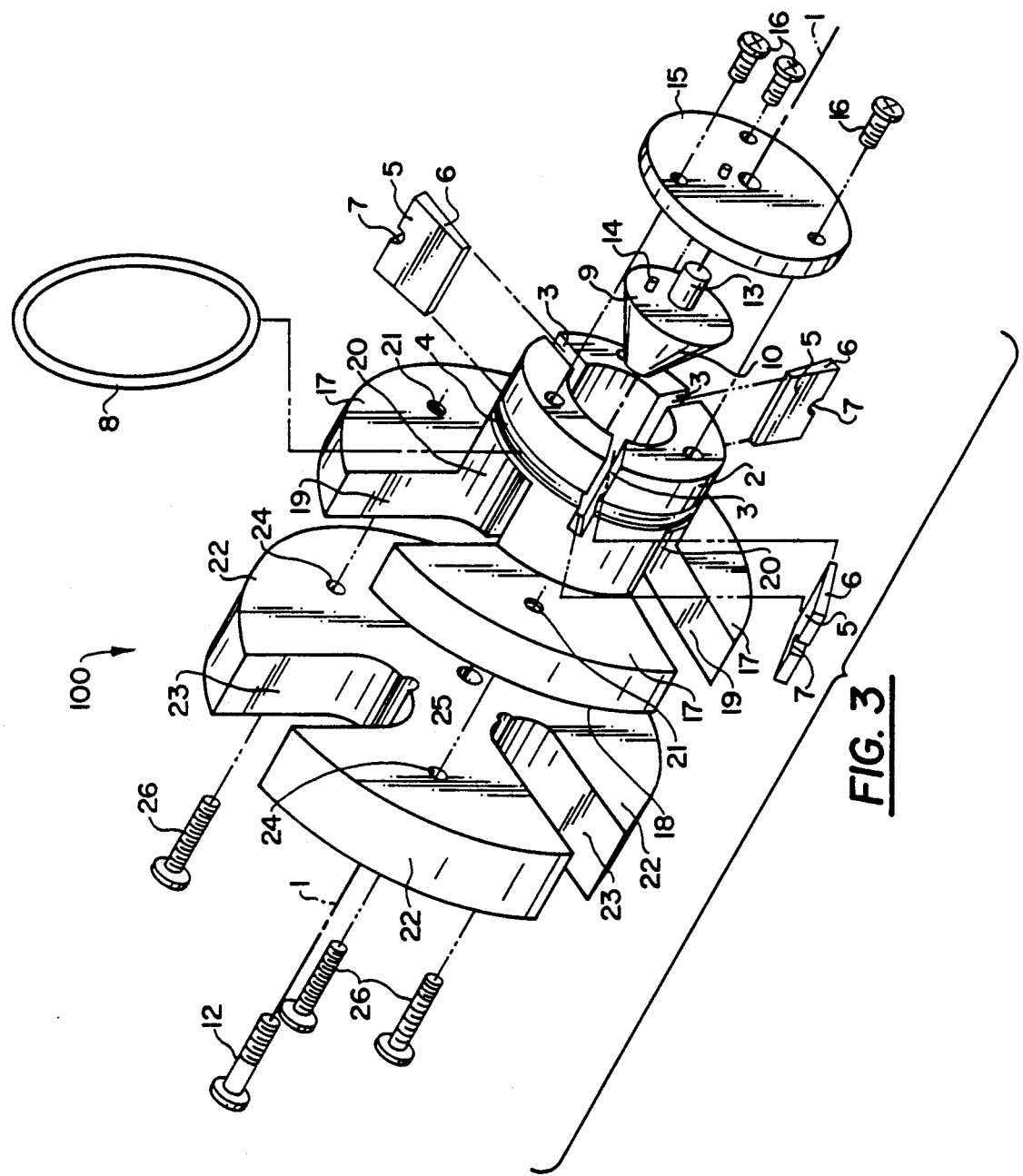
FIG. 3 is an exploded view of the same apparatus as shown in FIG. 2 from a rear view perspective.

FIGS. 2 and 3 show the preferred embodiment of this invention.

Numeral 41 indicates the axis of the chuck stop apparatus 100 which will be referred to in the following exposition.

The part of the web apparatus used to secure it to the chuck will now be described. A tubular section 42 which has a maximum diameter slightly smaller than the diameter of the bore of the chuck within which it is inserted extends axially from the bottom, second face of the web apparatus. The tubular section 42 is preferably round in cross section. The tubular section 42 has three slots 33 which are cut from the end of the tubular section in the axial direction. The slots 43 extend radially through the walls of the tubular section 42. The slots 43 are disposed in 120 degree intervals. The tubular section 42 also has a circumferential groove 44 on its outer surface.

Three inserts 45 are positioned in the slots 30. The radial inner edge of the inserts 45 are beveled in relation to the square, radial outer edge of the inserts 45. The radial inner edge is thickened to form a shoulder 46 so that the individual insert cannot fall out of the tubular section 42. Each of the inserts 45 has a notch 47 near the middle of the radial outward edge. In use, the outer edge of the insert 45 will be near and parallel to the outer, peripheral region of the tubular section 42, whereas the inner edge of the insert 45 will be tapered so as to provide a cammed surface which is used to force the inserts 45 outward, as described below. The tubular section 42 also has a circumferential groove 44 on its outer surface that is in axial alignment with notches 47 of the inserts 45.

A rubber O-ring 48 is fitted in the circumferential groove 44 and the notches 47 in each of the inserts 45. The O-ring 48 serves to bias the inserts 45 radially inward so that they do not interfere with the placement of the tubular section 42 into the bore of the chuck. Thus, being capable of securing the chuck stop in place, relative to the chuck bore, the clamping inserts 45 and corresponding O-ring 48 render the chuck stop 100 capable of fitting into chucks with a variety of bore sizes.

A draw plug 9 is provided within the tubular section 42. The draw plug 9 has a conical surface 10 which is configured to accommodate the taper provided by the beveled, inner edges of the inserts 45. The draw plug 9 has a threaded hole 11 at its conical tip 90. A draw plug screw 12 extends axially through the body of the web apparatus and threads into threaded hold 11. Opposite the threaded hole 11 a large pin 13 on the center axis of the draw plug 9 and a small pin 14 off the center of the draw plug 9 fix the position of the draw plug 9 radially, thereby, restraining draw plug 9 from rotation.

A circular cap 15 is secured to the end of the tubular section 42 by three flat head screws 16. The circular cap 15 has a hole for each of the small and large pins of the draw plug to slide in.

Integral with and extending radially outward from the end of the tubular section 42 opposite the capped end are three webs 17. The webs have a first face 180 on the side of the cap and a second face 18, which is parallel to first face 180 opposite that. The faces are parallel with each other and square with the axis of the tubular section 42. That is, the faces are parallel and both are perpendicular to the outside of the tubular section 42. The webs 17 are separated by three radial gaps 19. These gaps 19 extend axially as large radial slots 20 in the tubular section 42 towards the capped end. The gaps 19 and large slots 20 accommodate closure of the jaws.

Each web 17 is provided with a centrally located axial threaded hole 21.

A face plate 22 which is preferably made of aluminum, steel or other materials is provided. The face plate 22 has three gaps 23 which correspond in dimension and location to the gaps 19 of the webs 17. The face plate 22 has three counter-bored holes 24 which correspond in location to the axial threaded holes 21 of the webs, thus, providing for the face plate 22 to be secured to the webs 17 by means of three machine screws 26. When mounted upon the webs 17, face plate 22 is parallel to web faces 180 and 18.

The face plate 22 has a fourth central counterbored hole 25 through which the draw plug screw 12 is inserted for securing face plate 22 to the webs 17.

Figure 5:
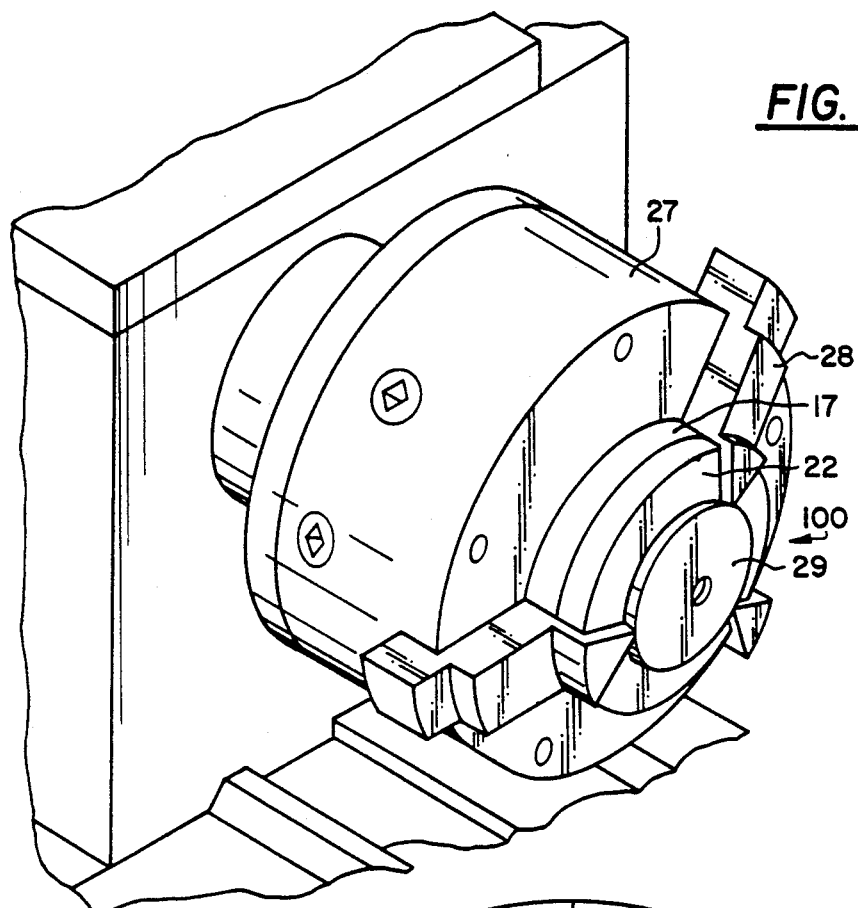
FIG. 5 shows the apparatus shown in FIGS. 2, 3 and 4 installed in a three jaw chuck.

Referring to FIG. 5, the use of the web apparatus 100 will next be described. The apparatus 100 is positioned in the multi-jaw chuck 27 so that the tubular section 42 is inserted into the central bore of the chuck 27. The large slots 3 in the tubular body 42, the gaps 19 in the webs 17 and the corresponding gaps 23 in the face plate 22 are aligned to accommodate the radial displacement of the jaws 28 of the chuck. When the apparatus 100 is positioned so that the face of the webs 17 are firmly set against the face 38 of the chuck 27, then the draw plug screw 12 is tightened. Tightening the draw plug screw 12 will cause the draw plug 9 to advance in the direction of its conical tip 90. The conical surface 10 of the draw plug 9 biases the inserts 5, which are restrained by the O-ring 48 radially outward. The radial outer edges of the inserts 45 will clamp against the inside of the bore of the chuck, securing the chuck stop apparatus 100 in place, relative to the chuck 27.

Work-piece 29 is then placed upon the face plate 22, held in place by the jaws 28 are closed.

The face plate 22 is provided in different thicknesses for use with different sizes and types of work-pieces. For example, if a very thin work-piece ring is to be machined, then a face plate 22 of considerable thickness, able to hold the work-piece ring right at the edge of the jaws will be used. That is, the face plate 22 must enable the chuck jaws 28 to securely hold the work-piece 29 in place without interfering with the machining process.

The face plate 22, itself, can be machined to accommodate the shape of a work-piece to be used. Although it is impossible to contemplate all of the ways in which the face plate 22 would have to be machined to accommodate a work-piece, an example is given. If a disk which has an integral stub extending from a first face opposite the face which is to be machined, the face plate 22 can be bored so as to accommodate the stub while the first face sits squarely against the face plate of the apparatus according to this invention. The face plate 22 can be machined in the lathe after it is secured in the lathe as described above, or it can be machined in a previous operation on a different piece of equipment such as a vertical mill.

Figure 6:
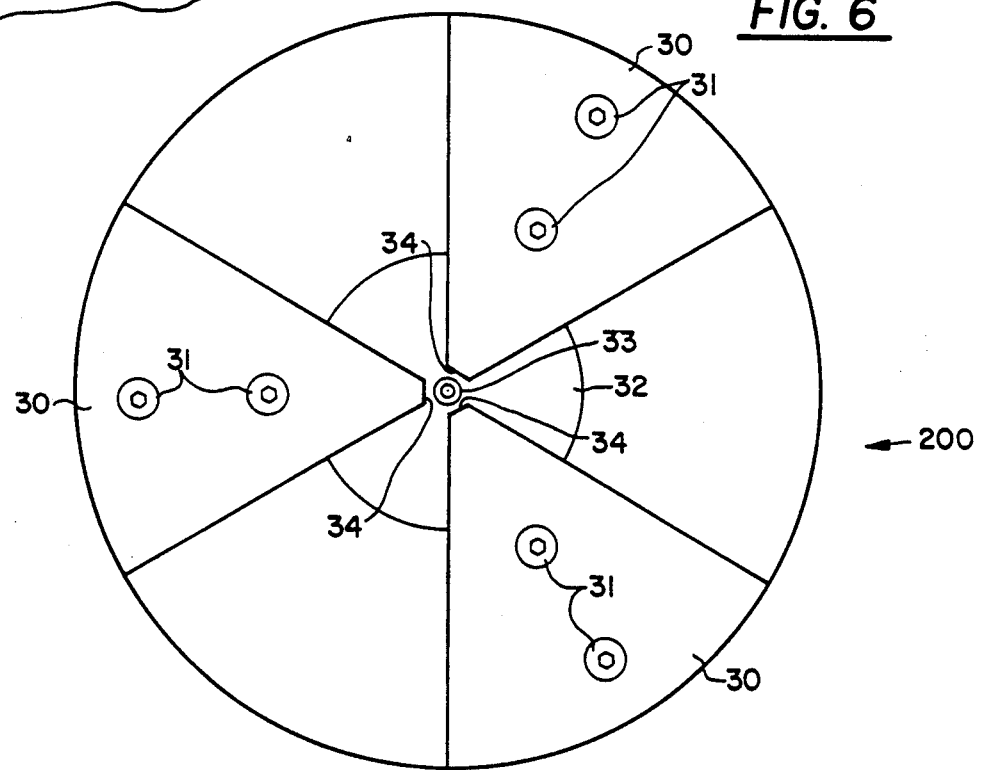
FIG. 6 is a front view of a second embodiment of the present invention.

FIG. 6 shows a second embodiment of the invention. The primary difference in this embodiment is that the face plate 32 is made in three parts 30. Each part 30 is connected with the webs (not shown) by two screws 31 which are counterbored into the face of the parts 30. The design allows the draw plug screw 12 to be moved back towards the draw plug 9 so that the screw 12 is not in the way of the jaws 28 of a chuck 27 in which the chuck stop 200 is used. The tips 34 of the parts 30 may then be designed to extend farther toward the center of the device, thus, allowing smaller diameter parts to be held in the chuck and squared using the chuck stop 200.

Although the invention has been described as applied to a three jaw chuck, it can be made for four jaw chucks. For a four jaw chuck, there would be four webs spaced 90 degrees apart, four large slots in the tubular section, and four corresponding slots in the face plate, or four sections of the face plate if a multi section face plate is used. Similarly, it could be adapted to multi-jaw chucks which have 2, 6, 8 etc number of jaws.

I claim:

1. An apparatus for use with a multi-jaw chuck, comprising:
    a tubular hub section securing means which is inserted in a central bore of said chuck, thereby, securing said apparatus in place relative to said chuck;
    a plurality of webs extending radially outwardly from said tubular hub section, said webs having a first face which is freely disposed squarely on a face of said chuck, and a second work support opposite face which is parallel to said first face, said webs having gaps thereinbetween through which the adjustable jaws of said chuck are radially displacable.

2. An apparatus according to claim 1 wherein said webs are provided in a number equal to the number of adjustable jaws of said chuck.

3. An apparatus according to claim 2 wherein said number of adjustable jaws is at least three.

4. An apparatus according to claim 3 wherein said number of jaws is three.

5. An apparatus according to claim 1 wherein said tubular hub section has slots contiguous with said gaps in said web portion.

6. An apparatus according to claim 1 wherein an outer diameter of said tubular hub section is nearly equal to an inner diameter of said central bore of said chuck.

7. An apparatus for use with a multi-jaw chuck, comprising:
    a tubular hub section securing means which is inserted in a central bore of said chuck, thereby securing said apparatus in place relative to said chuck, said securing means comprising:
    three slots extending radially from an inside wall of said tubular hub section to an outside wall of said tubular hub section, said slots spaced equally about said tubular hub section,
    inserts which are generally flat pieces of metal fitted in said slots, said inserts having outer edges and inner edges angled with respect to said outer edge, said inner edges providing a tapered structure when said outer edges are held approximately parallel to said outside wall, said inner edges being thickened, a draw plug comprising a conical surface disposed in relation to said tapered structure, a threaded hole at the tip of said conical surface, a first pin on the opposite side from said threaded hole on the center of said axis of said draw plug, and a second pin near said first pin, a cap which secures to said end of said tubular hub section comprising a first hole for accommodating said first pin and a second hole for accommodating said second pin and, a screw which extends through said web section into said threaded hole in said draw plug;

said apparatus further comprising webs extending from said tubular hub section, said webs having a first face which is freely disposed squarely on a face of said chuck, and a second work support opposite face which is parallel to said first face, said webs having gaps thereinbetween through which the adjustable jaws of said chuck are radially displaced.

8. A chuck stop for a multi-jaw chuck comprising:

a web section comprising plural webs, each of which extends radially in circumferential slotted spaces disposed between said multiple jaws of the chuck, said webs comprising first surfaces which can be rested on the face of the chuck, and second work bearing surfaces which are opposite and parallel to said first surfaces, a hub section to which said webs are connected, said hub section freely insertable into a central bore of the chuck, a securing means in said hub section for gripping said inner wall of said central bore.

9. A chuck stop apparatus as claimed in claim 8 further comprising a planar, detachable face plate which sits on said second work bearing surfaces of said web section so that it is substantially equal in plan to said web section.

10. A chuck stop apparatus as claimed in claim 8 wherein said securing means in said hub comprises a clamping means for exerting an outward force on an inner wall of said central bore.

11. A chuck stop apparatus as claimed in claim 11 wherein said planar, detachable face plate is capable of being machined to accommodate a particular configuration of a work-piece to be machined.

12. A work-piece mounting apparatus for use with a multi-jaw chuck having a central bore comprising:

a base plate for receiving a work-piece, said base plate having a top side, an under side and a central core, said base plate being substantially equal in plan to the face of said chuck with means defining slots to allow movement of said jaws with respect to said base plate, a central hub extending axially from said under side of said base plate so as to be removably disposed within said central bore of said multi-jaw chuck; and means for releasably securing said central hub within said central bore.

13. A work-piece mounting apparatus as in claim 12 wherein said releasable securing means includes a plurality of members mounted within said central hub so that each member is radially extendable and retractable relative to said central hub and means for actuating said members between extended and retracted positions.

14. A work-piece mounting apparatus as in claim 12 wherein said mounting apparatus further includes a face plate removably attached to said base plate, said face plate having a first and second sides and a central core, said first and second sides being interchangeable on said base plate.

15. A work-piece mounting apparatus as in claim 14 wherein said face plate further comprises multiple sections equal to said multiple base plate sections in size and radial alignment.

16. A work-piece mounting apparatus as in claim 13 wherein said actuating means includes a draw plug having a central axis, first and second ends and a conical surface having a tapered end extending therebetween, said conical surface being disposed in relation to said plurality of members, said draw plug also having a threaded hole extending along the central axis thereof at said tapered end and a screw rotatably retrieved within said central cores of said apparatus and being threaded into said threaded hole of said draw plug so that rotation of said screw will axially displaced said draw plug thereby controlling the radial position of said members.

17. A work-piece mounting apparatus as in claim 12, wherein three (3) of said wedges are mounted within said central hub.

18. A work-piece mounting apparatus as in claim 12, wherein said central hub comprises means defining slots to allow movement of said jaws.

19. A work-piece mounting apparatus as in claim 18, wherein said slots extend to a point along said hub axially above said distal end containing said wedges.

20. A work holder for use with a multi-jaw chuck having an axially extending central bore, said holder comprising:

a plate member having front and rear surfaces, a tubular portion extending axially outward from the rear surface, both said rear and front surface being substantially planar, said rear surface being in contact with a face of said chuck, said plate member having at least two radially extending slots for receiving the jaws of said multi-jaw chuck, said tubular portion interfitting with said central bore, and radially extending and retracting means mounted within said tubular portion so as to releasably retain and workholder within said chuck.

* * * * *